United States Patent
Bunn et al.

(10) Patent No.: US 9,228,479 B2
(45) Date of Patent: Jan. 5, 2016

(54) MARINE DIESEL ENGINES

(71) Applicant: MARINE PROPULSION TECHNOLOGIES LIMITED, Auckland (NZ)

(72) Inventors: Murray Noel Bunn, Auckland (NZ); Clinton Bert Keith Wishart, Auckland (NZ)

(73) Assignee: MARINE PROPULSION TECHNOLOGIES LIMITED, Auckland (NZ)

( * ) Notice: Subject to any disclaimer, the term of this patent is extended or adjusted under 35 U.S.C. 154(b) by 0 days.

(21) Appl. No.: 14/417,927

(22) PCT Filed: Sep. 24, 2013

(86) PCT No.: PCT/NZ2013/000177
§ 371 (c)(1),
(2) Date: Jan. 28, 2015

(87) PCT Pub. No.: WO2014/051437
PCT Pub. Date: Apr. 3, 2014

(65) Prior Publication Data
US 2015/0192057 A1      Jul. 9, 2015

(30) Foreign Application Priority Data
Sep. 27, 2012   (NZ) ........................................ 602679

(51) Int. Cl.
*F01N 3/00*     (2006.01)
*F01N 5/04*     (2006.01)
(Continued)

(52) U.S. Cl.
CPC ................ *F01P 3/02* (2013.01); *B63H 21/383* (2013.01); *B63H 21/386* (2013.01); *F01N 3/043* (2013.01); *F01N 3/046* (2013.01); *F01N 13/004* (2013.01);
(Continued)

(58) Field of Classification Search
CPC ......... F01P 3/02; F01P 11/18; F01P 2050/02; F01N 3/046; F01N 2590/02; F01N 3/043; F01N 13/004; Y02T 10/144; Y02T 10/20; F02B 37/00; F02B 37/02; F02B 1/12; B63H 21/383; B63H 21/386
See application file for complete search history.

(56) References Cited

U.S. PATENT DOCUMENTS 4,187,678 A * 2/1980 Herenius ................. F01N 3/046
                                                              60/280
4,214,443 A    7/1980 Herenius
(Continued)

FOREIGN PATENT DOCUMENTS

EP          2009259          12/2008

OTHER PUBLICATIONS

International Search Report, PCT/NZ2013/000177, Feb. 24, 2014.

*Primary Examiner* — Jesse Bogue
*Assistant Examiner* — Diem Tran
(74) *Attorney, Agent, or Firm* — Young & Thompson

(57) ABSTRACT

In a marine conversion of a "Duramax" V8 diesel engine, each bank of cylinders has a jacketed exhaust manifold including a solid elongated casting including coolant galleries and a central exhaust duct. Recirculating coolant cools each cylinder then enters the exhaust manifold through separate apertures aligned with openings made by removal of a frost plug. Each manifold coolant aperture has a controlled diameter, ensuring most of the coolant passes along the length of the engine then along the manifold yet enough coolant cools each cylinder. The coolant then traverses and cools a manifold extension and a turbocharger.

9 Claims, 2 Drawing Sheets

Figure 1:
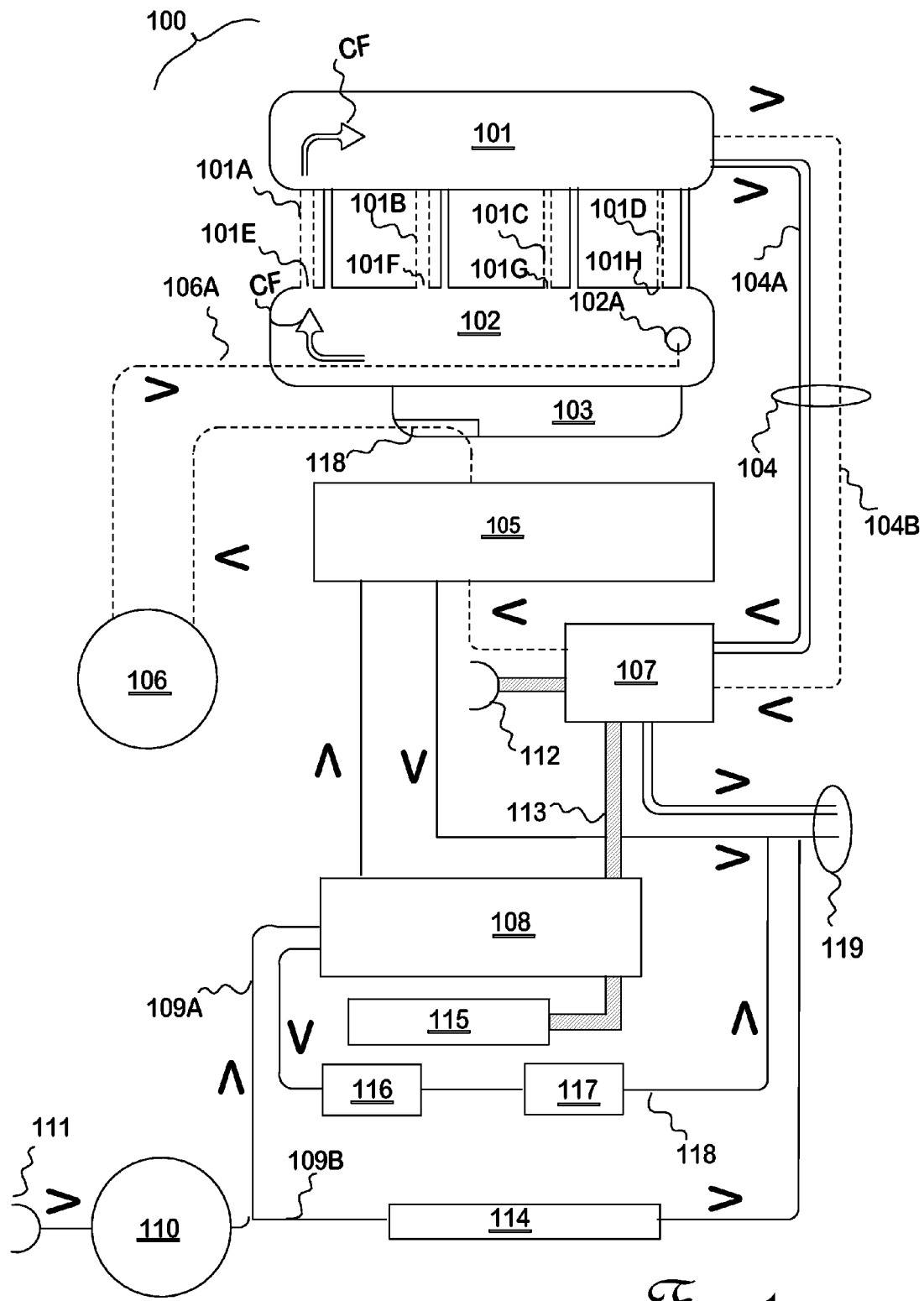

(51) Int. Cl.
*F01N 3/02* (2006.01)
*F01N 1/00* (2006.01)
*F01P 3/02* (2006.01)
*F01N 3/04* (2006.01)
*F02B 37/00* (2006.01)
*B63H 21/38* (2006.01)
*F01N 13/00* (2010.01)
*F02B 1/12* (2006.01)
*F02B 37/02* (2006.01)
*F01P 11/18* (2006.01)

(52) U.S. Cl.
CPC . *F02B 1/12* (2013.01); *F02B 37/00* (2013.01); *F02B 37/02* (2013.01); *F01N 2590/02* (2013.01); *F01P 11/18* (2013.01); *F01P 2050/02* (2013.01); *Y02T 10/144* (2013.01); *Y02T 10/20* (2013.01)

(56) References Cited

U.S. PATENT DOCUMENTS

| | | | | |
|---|---|---|---|---|
| 5,109,668 | A | * | 5/1992 | Lindstedt ............... F01N 3/046 60/310 |
| 7,287,493 | B2 | * | 10/2007 | Buck ..................... F01P 3/207 123/41.01 |
| 8,887,496 | B2 | * | 11/2014 | Jarzombek ............. F01N 5/02 60/274 |
| 2006/0005791 | A1 | | 1/2006 | Obidi |
| 2006/0096555 | A1 | | 5/2006 | Buck |
| 2007/0062182 | A1 | | 3/2007 | Westerbeke |
| 2011/0308237 | A1 | * | 12/2011 | Nagayama ........... F01N 13/102 60/321 |
| 2013/0142703 | A1 | | 6/2013 | Westerbeke, Jr. |

* cited by examiner

MARINE DIESEL ENGINES

FIELD

The invention relates to a modification of an internal combustion engine in order to provide an inboard motor installation for a boat that is compatible with marine requirements; in particular a diesel engine made compatible with marine installations in small to medium sized craft.

DEFINITIONS

The "rear" of a diesel or petrol engine is the end nearest the flywheel and the coupling for power. The "front" is the opposite end. In relation to the schematic of FIG. 1, the front is at the left side of block 102.

"Raw water" refers to environmental or external water obtained from outside the boat or other vessel having an engine as described herein, and used to carry heat out of the engine and related equipment.

"Coolant" refers to a conventional coolant such as water mixed with glycol or other materials intended to lower the freezing point, and typically including corrosion inhibitors.

BACKGROUND

Conversion of an internal combustion engine originally designed for a road vehicle into a marine-adapted version (including salt-water and fresh-water variants) to be run inside an isolated compartment is often carried out; but often not with great success.

A number of factors are relevant to inboard boat installation as compared with motor vehicles.

1. The enclosed housing in a boat—a structure often including combustible materials unlike the engine compartment of a motor vehicle—requires the engine to be kept cool. It is desirable that no part of the engine becomes hot (over about 125 deg C.) because an excessive temperature and amount of radiant or convective heat arising from an exhaust system is likely to char or cause a fire in any inflammable materials nearby. Marine regulations have been written to specify the limits of heating that are allowed.

2. When a boat engine is being used, it is typically operated at perhaps 70-85% of maximum capacity for long periods which is not often the case in a motor vehicle. More heat is evolved as a result than might be expected from vehicle experience.

3. On the other hand, an ample supply of fresh cooling medium (herein called raw water) is available as long as reliable circulation is assured. The primary dump of heat is made into raw water rather than air.

Ways to decrease the amount of heat given off by an exhaust manifold are known in the automotive industry. For example, a white coating or an insulating layer of ceramic mixture is applied to the exterior of the manifold. More simply, exhaust wrap may be wrapped completely around the manifold. Local overheating under the coating or wrap can lead to premature degradation of the manifold.

Most marine conversions include a water-cooled engine having a heat exchanger for dissipating heat from the engine itself into the ample supply of external cooling water. It is desirable that they include a water-cooled exhaust system. This specification does not describe placement of a catalytic converter (if any) but the skilled addressee will know how to install and maintain a catalytic converter within an appropriate part of the exhaust system.

A factor of relevance for the selected type of engine is that the input site for engine coolant (102A in FIG. 1) is situated at the rear of the engine while marine conversions reverse the general flow of exhaust gases to direct those gases toward the rear.

PRIOR ART

A recent publication in this field is US2013/0142703 describing a flow of coolant along or within the exhaust manifold. In this example there is an internal space between the cooled jacket and the manifold itself. It seems that the coolant is an open circuit using raw water. The coolant does not arise from the engine head. EP2009259; a marinisation kit, discloses an exhaust manifold containing a large volume of coolant which flows alongside a connection taking exhaust gases to the turbocharger. US2006/0096555 describes an internal combustion engine having a hybrid cooling system. A recirculating coolant passes in equal proportions beside any one of the separately cast cylinders, then through a separate channel beside each exhaust port, through a gasket and into the exhaust manifold, which also includes a heat exchanger for cooling the coolant with raw water. None of these disclose any form of control over relative flows of coolant along the or each bank of cylinders and passing into the exhaust manifold.

PROBLEM TO BE SOLVED

The over-riding goal is to provide a safe, compact and effective marine conversion, having no parts that are capable of either enduring or radiating excessive heat from the engine during any mode of operation, even if placed inside a closed compartment. One particular goal is to minimise the number of exposed external coolant pipes in this marine conversion, for the sake of compactness, low cost, and reliability. It is desirable to minimise the number of flexible non-metallic pipes—such as pipes of rubber or like materials carrying coolant. Most coolant channels are metal pipes or are channels within massive structures. A more significant goal is to optimise the rate of flow of coolant inside the engine and inside the exhaust manifold in order that heating of the engine head and the exhaust manifold are relatively even An even more significant goal is that no engine parts shall rise in temperature so much as to exceed the manufacturer's specifications, and in particular to ensure that marine regulations limiting a maximum manifold temperature are not breached. A well-known risk in boat construction is that a hot exhaust manifold lacking any cooling jacket can radiate so much heat at a high temperature that the "engine room" typically a small compartment surrounding the engine and—perhaps inadvertently—incorporating flammable materials may be set on fire.

OBJECT

An object of the present application is to provide a safe and effective marine conversion of an internal combustion engine for marine use in which a pattern of coolant flow is optimised with regard to minimisation of excessive temperature rise, or at least to provide the public with a useful choice.

SUMMARY OF INVENTION

In a first broad aspect the invention provides an internal combustion engine 100 having a front and a rear and adapted or converted for marine use, including a turbocharger 107 for compressing aspired air, driven when in use by exhaust gas pressure, the engine being internally cooled by a first internal closed coolant circuit with coolant flow caused by pump 106 and connected through one or more non-mingling heat exchangers 105 to a flow of raw water caused to flow by pump 110 in a second, open circuit; the engine having at least one bank of combustion chambers 102, each chamber having a corresponding exhaust port brought to a manifold face of an engine head, wherein one exhaust manifold 101 for each bank of combustion chambers is formed from a solid thermally conductive mass having a thick wall 213 surrounding a duct 214 capable when in use of carrying hot exhaust gases from the exhaust ports; the wall being sufficiently thick to include a plurality of internal conduits or galleries 215, 216, 217, 218; the exhaust manifold has a closed end 203 and an open end 202; coolant apertures 101E, 101F, 101G, 101H are formed through the manifold face of the engine, each aperture creating an opening into an internal coolant gallery surrounding each combustion chamber; the manifold surface along one side of the exhaust manifold adjacent the engine includes a series of exhaust channels 206 aligned with the exhaust ports and leading into duct 214, and includes a series of coolant channels 101A nearest the front, 101B, 101C and 101D nearest the rear, each connecting a corresponding one of coolant apertures 101E-H into the plurality of internal conduits or galleries 215, 216, 217, 218 of the exhaust manifold, wherein said coolant channels thereby adding the exhaust manifold to the internal closed coolant circuit and when in use limiting a temperature of the exhaust manifold by removing at least some heat into the coolant; the exhaust manifold 101 further includes at least one outlet at the open end for coolant and an outlet for exhaust gases; said outlets being aligned with corresponding inlets of an exhaust manifold extension 104 serving to separately carry the coolant as 104B and gas outflow as 104A from the exhaust manifold to at least one turbocharger 107; and wherein each coolant channel is provided with a predetermined resistance to flow of coolant therethrough such that the coolant channel 101A provides a path of least resistance for coolant flow within the engine and the manifold; said path traversing the interior of the engine from a rear inlet 102A to the front, through the aperture 101E and the coolant channel 101A and then traversing the length of the exhaust manifold towards the open end 202 thereby when in use limiting the maximum temperature of the exterior of the manifold to an amount compatible with use in a marine inboard engine installation yet maintaining a flow of coolant throughout the engine.

Preferably the coolant channel 101A nearest the closed end of the exhaust manifold is provided with a predetermined least resistance to flow of coolant of any of the coolant channels yet the remaining coolant channels (101B, 101C and 101D) are provided with a predetermined resistance to flow greater than that of channel 101A, sufficient to ensure, when in use, at least a sufficient flow of coolant for maintenance of cooling of each chamber of the engine while ensuring that a substantial proportion of coolant traverses the length of the engine from rear to front and then traverses the length of the exhaust manifold from front to rear.

Preferably the apertures in the engine head manifold face are made by removing existing frost plugs at sites that are adjacent the exhaust ports.

More preferably, the predetermined resistance to flow at each channel 101A, 101B, 101C and 101D formed through the manifold face of the exhaust manifold is determined by making a circular hole of a specified diameter into an adjacent gallery within the exhaust manifold.

Preferably the exhaust manifold is cast from aluminium or an aluminium alloy.

Preferably the exhaust manifold has
a) an external surface and a configuration determined in width and length by physical dimensions of an existing engine block face or engine head; and an inlet side having apertures substantially contiguous with apertures formed within said engine block face or engine head by removal of frost plugs;
b) a first end comprising an aperture for exhaust gas and a second, sealed end;
c) at least one channel receiving hot exhaust gas from the engine head manifold surface through one or more exhaust gas ducts each contiguous with a corresponding controlled exhaust gas conduit capable of emitting at least partially cooled exhaust gases from the surface of the existing engine head;
d) passages for receiving coolant from the engine head manifold surface through at least one coolant ducts each contiguous with an opening on to the engine block face or engine head and having an aperture size graded or selected in order to direct the coolant through the length of the exhaust manifold and forwarding said coolant through one or more interior channels or galleries surrounding and in thermal contact with conduit means for carrying exhaust gas and to a coolant outlet means, so that when in use the manifold presents a relatively cool exterior.

In a related aspect, the total area of the holes receiving coolant from the engine into the exhaust manifold is determined in proportion to the power rating of the engine.

By way of non-limiting example, the total area of the holes receiving coolant from the engine into one exhaust manifold is set at from 415 to 490 square millimeters, according to the expected power output and efficiency, when in use in a marine application, of a 6.6 Liter V-8 "Duramax" 8 cylinder engine.

In an alternative aspect, the flow of coolant through each coolant duct is selected to provide a greater flow of coolant toward the closed end of the manifold while maintaining at least a minimum flow of coolant past each combustion chamber, thereby providing an even rate of heat removal along the bank of combustion chambers.

In a further related aspect, the manifold extension 104 includes an inlet to an internal exhaust gas duct 104A surrounded by coolant galleries 104B having at least one inlet physically aligned with a corresponding outlet from the exhaust manifold 101; said duct and galleries serving, when in use, to carry the coolant and gas outflows of the exhaust manifold to at least one turbocharger 107 while flowing coolant serves to limit the maximum external temperature of the manifold extension.

In a yet further aspect, the turbocharger 107 has a thermally conductive exterior including at least one gallery 401, 402 for coolant having an input physically aligned with a corresponding outlet for coolant from the manifold extension; thereby limiting the temperature of the turbocharger compatible with use in a marine inboard engine.

In a second broad aspect, the recirculating coolant is always contained within a range of structures including pump bodies, heat exchangers, rigid pipes, ducts and channels, the layout or design minimising use of pipes and especially pipes having non-metallic resilient walls.

Preferably the duct or pipe carrying coolant from a non-mingling heat exchanger to an intake of a coolant pump is thermally and mechanically in contact with a sump of the engine.

In a third broad aspect the invention provides, as part of a marine conversion of an internal combustion engine suitable for inboard marine use, a non-mingling heat exchanger serving as an oil cooler (114) including pressure relief means comprising a valve openable in an event of a pressure differential arising within the oil cooler between an oil input and an oil output pipe; the valve being connected between the oil input and the oil output.

PREFERRED EMBODIMENT

The description of the invention to be provided herein is given purely by way of example and is not to be taken in any way as limiting the scope or extent of the invention.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Each document, reference, patent application or patent cited in this text is expressly incorporated herein in their entirety by reference. Reference to cited material or information cited in the text should not be understood as a concession that the material or information was part of the common general knowledge or was known in New Zealand or in any other country.

Please note that this specification does not describe catalytic conversion apparatus for use in reducing undesired emissions. If required, such apparatus is best located within or near the exhaust mixing elbow 119. Nor does this specification describe any silencer, or any marine exhaust ejector for drawing hot air out of an engine room. This specification does not describe the conventional thermal expansion chamber for coolant. Temperature regulation and monitoring are not described or shown here. As is known in the relevant arts, thermostat mechanisms such as temperature-responsive bypass valves may be used, either within the coolant circuit or within a flow of raw water, for example to block flow and allow the engine to come up to an operating temperature before intense cooling is applied, or to regulate temperature. Coolant flow may be regulated by manually operated control or computer controlled valves, so that the engine runs at an optimal temperature.

DRAWINGS

FIG. 1: is a schematic diagram showing inter-relationship of the parts of the marine engine system with a closed circuit for flow of coolant and an open circuit for flow of raw water.

Figure 2:
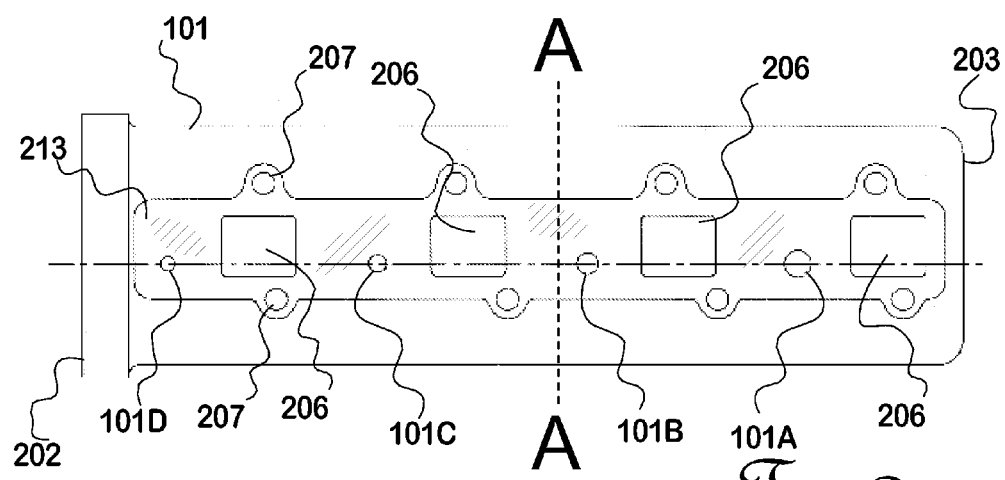

FIG. 2: shows to scale a drawing including the planed face of a typical exhaust manifold that will be sealed on to the (or each) cylinder head.

Figure 3:
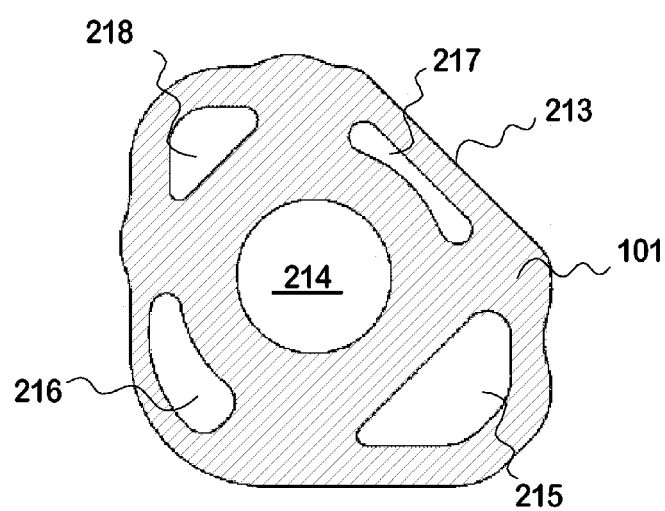
Figure 4:
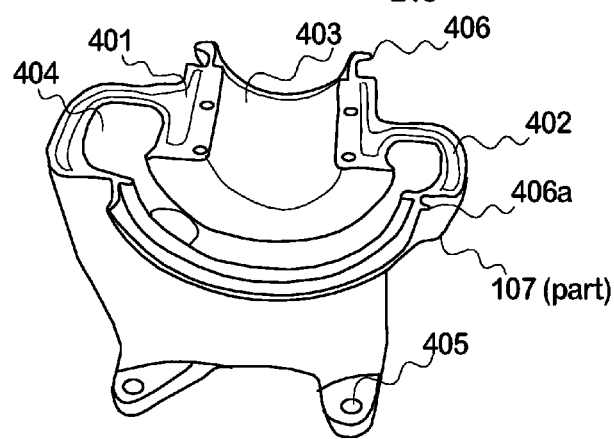

FIG. 3: shows to scale a section through the exhaust manifold of FIG. 2 at A-A FIG. 4: is a perspective view, from a photograph, of half of the casing for the turbocharger.

INTRODUCTION

This marine conversion of a diesel engine provides each bank of cylinders with a replacement jacketed exhaust manifold comprising a solid elongated metal casting. Each manifold includes coolant galleries and a central exhaust duct, opening at one end to a jacketed manifold extension carrying both coolant and exhaust gases and leading to a turbocharger. Coolant, having already cooled the adjacent cylinder (but not, usually more than one cylinder), enters a side of the manifold alongside each exhaust port through one or more ducts or apertures each aligned with an engine head duct made by removal of an existing frost plug—which had been installed as a consequence of the head casting process. Each manifold duct or aperture has a flow-restricting diameter predetermined so that most of the coolant, which enters the selected engine toward the rear, is forced to pass along the length of the manifold yet sufficient coolant passes each cylinder to evenly cool the cylinders. In addition, the layout of coolant channels (laid out according to the schematic in FIG. 1) and the physical shapes of the components ensures that the converted engine is compact and suited to marine duty.

Table of Labels and Parts, referred to in FIGURES and text.

101 coolant-cooled exhaust manifold
101A . . . D selected, varying diameter coolant connections
101E . . . H coolant connections from inside the engine
102 engine head (one bank shown)
102A Entry into engine of coolant from pump
103 coolant transfer across engine sump
104 jacketed manifold extension carrying exhaust to turbocharger
104A exhaust pipe within manifold extension
104B coolant channel or channels within manifold extension
105 engine coolant heat exchanger
106 coolant pump for closed circuit
106A coolant pipe; pump to engine block
107 turbocharger
108 heat exchanger for air compressed by turbocharger
109A water from pump 110 to exchangers
109B water from pump 110 to oil cooler 114
110 raw water pump
111 sub-surface water inlet port
112 air intake into turbocharger compressor
113 air exit from turbocharger compressor
114 oil cooler
115 inlet manifold (one shown)
116 fuel cooler
117 power steering oil cooler
118 return coolant via sump to pump
119 exhaust including water spray into exhaust gas
202 open end of exhaust manifold
203 closed end of exhaust manifold
207 fastener aperture
213 face surface of exhaust manifold
214 exhaust duct
215, 216 217, 218 channels for coolant in casting of manifold.
401, 402 channels for coolant
403 aperture for exhaust of turbocharger
404 gas track or volute of turbocharger
405 fastener aperture
406, 406a fastening ring for "V-band clamp".

EXAMPLE 1

The currently preferred type of engine is a General Motors (Duramax 6.6 Liter 8 cylinder 90 degree V form V8; Isuzu/GM, Moraine, Ohio, USA) as described in this Example. It has been designed for use in road vehicles. That engine has two rows of 4 pistons in separate banks, but for simplicity only one bank, one exhaust manifold, and one inlet manifold are described here. This invention is not limited to this particular type of engine, described by way of example only.

The Duramax engine, unlike many that are selected for marine conversions, has a preferred coolant flow from the rear (to the right side of schematic FIG. 1) of the engine to the front. As a result, the existing rear and only entry point 102A for coolant ensures that when in use in a vehicle, this engine does not become too hot in a region close to the firewall placed behind the engine. Exhaust manifolds in vehicles may be covered by a shield but are not cooled by coolant. For marine purposes, when a jacketed exhaust manifold having the open or delivery end directed toward the rear of the engine and receiving coolant from the head through the gasket is attached, then in the absence of deliberate action the outlet end of the exhaust manifold will receive most of the coolant which bypasses the remainder of the cylinders toward the front of the engine, at the expense of proper engine cooling and without cooling the entire exhaust manifold.

FIG. 1 is a schematic diagram describing the paths taken by coolants. The engine uses a formulated coolant of a type known to those skilled in the art in a first, closed circuit shown as short dashed lines including coolant pump 106. Raw water for removal of heat from the converted engine, such as inside non-mingling heat exchanger 105, is an open circuit shown here as solid lines commencing at intake 111. Raw water is taken from the environment, passed through heat exchangers, and in this Example is sprayed into the exhaust after use in accordance with the "wet exhaust" procedure. Exhaust gases are carried in an unhatched duct having solid lines and air is carried in a hatched duct. Raw water taken from the environment does not enter the engine body, engine head, or exhaust manifold.

The path of coolant circulating around the preferred diesel engine in a closed circuit, according to the invention and with reference to FIG. 1, is as follows.

1. The coolant is pressurised within a coolant pump 106, mounted against the engine and driven by a train of gears from the engine cam shaft.
2. The coolant passes along a conduit 106A into the or each engine block 102 entering the block at 102A, at the inlet provided by the manufacturer.
3. The coolant travels through the usual cooling channels inside the engine alongside the combustion chambers as provided by the engine manufacturer, who had intended the coolant to remain inside the engine until discharged at the front into a thermostatically controlled return path. According to this invention the coolant circuit is extended so as to cool the exhaust manifold, the manifold extension leading to the turbocharger, and the turbocharger itself as shown in the remaining FIGS. 2-4.
4. According to the invention, the coolant is collected at the engine manifold face at the head surface of the engine and exits from apertures made for the purpose of this invention at 101E, 101F, 101G and 101H through the corresponding channels 101A, 101B, 101C and 101D. The coolant enters a single-ended water-cooled exhaust manifold 101, where it travels through a set of channels or galleries alongside, and forming an effective jacket for, a central wide conduit for hot exhaust gases also emerging from the engine head. A substantial proportion of the coolant flow traverses the entire manifold. The surface of the manifold to be applied against the engine head is shown in FIG. 2.
5. The water-cooled exhaust manifold 101 is comprised of a cast block of metal. An example cross-section at A-A in FIG. 2 is shown to scale in FIG. 3. Galleries 215, 216, 217 and 218 are part of a network of galleries that carry coolant within the manifold.
6. The coolant emerges from the same end of the exhaust manifold as does the hot exhaust gas, and is directly carried inside channels 104B inside a ducted casing of a manifold extension 104 leading hot gases inside duct 104A to a turbocharger turbine 107, meanwhile absorbing some heat from the exhaust gases and in particular limiting any temperature rise of the exterior of the extension. Of course, the amount of heat absorbed detracts from turbocharger efficiency and an optimum should be absorbed, taking into account the specifications of the turbocharger.
7. A turbocharger. 107 is used in the conventional way to take in air at air intake 112 and compress the air for engine aspiration, which is provided at outlet duct 113. The inevitably heated air then passes through and is cooled by non-mingling heat exchanger 108 and enters the inlet manifold 115 of the engine.
8. The coolant passes through the jacketed turbocharger 107 (FIG. 4) which includes cavities or channels outside the space occupied by the fan, again in order to limit the maximum external temperature as well as to remove some heat from the exhaust and intake gases. Turbocharger bearings are protected from excess temperature rise. Energy given up by the exhaust gas is partially reflected as a cooler gas temperature after the turbocharger.
9. The coolant emerges from the turbocharger and passes through non-mingling heat exchanger 105, where it is cooled by partially warmed raw water that has already cooled the compressed air 113 emerging from the turbocharger 107 inside another non-mingling heat exchanger 108. The coolant then returns to the coolant pump 106. Conveniently, the coolant passes through a metal channel 118 traversing one end of the engine sump 103. Channel 118 minimises the number of free or unsupported pipes and to a small extent provides direct cooling of any oil in the sump. Note that this coolant flow path is an aspect of the invention that supports use of short, direct metal pipes rather than flexible, non-metallic hoses to be used for coolant and water flows. Channel 118 also helps, to some extent, to cool the engine oil in the sump. While this description states that all the engine coolant passes through the manifold, turbocharger and heat exchanger, a bypass (not shown) controlled by a thermostat may be included, for example around the heat exchanger 105, to provide for optimised engine warmup.

The open-circuit flow of raw water obtained from outside the boat or other vessel, brought through heat exchange structures of the converted diesel engine and returned to the environment after absorbing waste heat, is as follows:

1. The raw water is received through a suitably protected and screened inlet port 111, and pumped by raw water pump 110 which preferably has a bronze housing and a bronze or hard rubber impeller. This pump is typically driven by a gear train or the like from the cam shaft of the engine.
2. Some of the now pressurised raw water passes through pipe 109A and traverses the non-mingling heat exchanger 108 used to cool the air intake air after compression. There are two subsequent paths for the warmed raw water. One path passes through fuel cooler 116 and then power steering oil cooler 117, and is then expelled as a spray into the engine exhaust near to an exit leaving the turbocharger at 119. The other path traverses non-mingling heat exchanger 105 to cool the engine coolant, and is returned to also be expelled at 119. It will be appreciated that the engine coolant is not brought down to the temperature of the raw water, in part because the raw water has already been warmed inside the air cooler 108.
3. The remainder of the pressurised raw water leaving pump 110 passes through pipe 109B and traverses an oil cooler 114 of the engine. Preferably the engine oil cooler 114 has a conventional series of internal parallel tubes carrying raw water, immersed in a conduit carrying oil. One optional version of the marine conversion provides two oil filters, in series, for better filtration). The relative volumes of water are determined by control of the relative resistance to flow in the different circuits. For the purpose of maintaining engine function if the oil path through the oil cooler inadvertently becomes blocked, the inventors prefer to place a pressure-responsive bypass valve 119 across the oil pipes (not shown) entering and then leaving the oil cooler 114 so that the valve will maintain an oil flow through the engine even if the oil is not cooled. No oil filter is shown in this schematic.

4. Finally, the warmed raw water is conventionally expelled as a spray into an engine exhaust mixing elbow at 119. The added water is atomised and helps to cool the exhaust in accordance with the well-known wet exhaust process. If there is a requirement for a dry exhaust, then the raw water will be returned directly into the environment.

Some of the novel components used in the schematic of FIG. 1 shall now be described. According to this invention, the exhaust manifold 101—one for each of the two engine manifold faces—is internally cooled. See FIG. 2 (view of the face) and FIG. 3 (section through the manifold at A-A). Each exhaust manifold has a body 101 and a machined facing surface 213 to be applied against the surface of the cylinder head, with the conventional perforated sealing gasket in between. A central exhaust gas duct 214 receives exhaust gas through the 4 apertures 206 each placed in alignment with an exhaust port from a corresponding cylinder of the engine, and The cylinders and manifold are sealably connected to each other by studs (bolts through holes 207, and a gasket which is not illustrated), according to standard practice. The manifold has a closed end 203 and an open end 202. This manifold removes the hot gases and the recirculating coolant out of one end rather than at the centre.

The coolant-cooled exhaust manifold is comprised of a cast block of metal; preferably using the same metal as that used for the engine head so that the thermal coefficient of expansion of each is the same and so that no electrolytic cell is created. Selection of the metal may also be directed to providing high thermal conductivity—such as aluminium or an alloy including aluminium. The manifold and the internal galleries and ducts is manufactured by methods known to those skilled in the art, including casting and then machining. An example cross-section is shown to scale in FIG. 3. A temperature gradient in the plane of the drawing FIG. 3 will exist within the material of the manifold, when in use, between the exhaust duct 214 and the four channels or galleries 215, 216, 217, 218 carrying coolant. Since the coolant channels are between the source of heat within the exhaust duct and the exterior surface of the manifold, the temperature rise of the exterior surface will tend to track the coolant temperature.

According to the invention, the manifold is internally cooled with recycled engine coolant which according to this invention emerges from the engine manifold head face through a plurality of internal coolant channels or galleries that receive coolant from the manifold coolant openings 101A, 101B, 101C and 101D that open on to the machined surface of the manifold. Corresponding contiguous apertures at 101E, 101F, 101G and 101H are created in the engine head most usually by removing some of the frost plugs that had been inserted as part of the manufacturing process, during machining of the casting. In that way, a flow of coolant from within ducts and cooling galleries surrounding each combustion chamber inside the engine head is assured. Each schematic channel 101A, 101B, 101C and 101D is comprised of a space left when a selected frost plug is removed from the engine head, plus an aperture through the sealing gasket, and an aperture inside the manifold 101 that is located within the facing surface so as to be against the corresponding engine aperture as shown in FIG. 2. The effective diameter of each aperture is variably predetermined as shown for example in FIG. 2, preferably by making a hole of selected diameter on the facing surface of the manifold although the hole diameter may be set within the gasket itself or within plugs that replace the frost plugs. The schematic channels are in practice short, perhaps corresponding in length to the thickness of the gasket between the exhaust manifold and the engine, plus the casting wall thicknesses, about 12 mm total in this Example. There are typically at least as many apertures as there are pistons. Here, a 1:1 correspondence is assumed. Note that hole diameter is a convenient correlate of relative resistance to flow, which is the parameter that the inventors want to control.

Scale drawing FIG. 2 shows an example of graded hole diameters upon the manifold face 213 according to one version of the invention. The inventors have optimised the diameter of the coolant channels 101A, 101B, 101C and 101D that admit coolant into the manifold, placing a relatively small hole 101D by the combustion chamber exhaust port at the outlet end 202, and increasing the diameter to a largest hole 101A near the closed end 203 of the manifold. Therefore, a greater flow is encouraged to pass through pipe 101A farthest from the engine inlet 102A and farthest from the outlet of the manifold 101. Use of smaller holes toward the rear of the engine helps to ensure that sufficient coolant flows through every part of the engine head, while the larger holes toward the closed end 103 ensures that a larger proportion of the coolant flows first along the entire length of the engine from rear to front, and then back again along the entire length of the manifold. This has the effect, for those engines that have a rearwardly placed coolant entry point 102A, of providing all cylinders of the engine and the entire manifold with a consistent flow of coolant. The invention encourages coolant flow through the entire engine and through the length of the manifold, while maintaining at least a minimum flow around all combustion chambers by setting a minimum hole diameter as a correlate of resistance to flow. Even if a selected engine does not have a rear coolant entry point, relative flows can be modulated according to the described invention. It should be noted that this objective can be attained in several ways, for example:

1. An increasing series of hole diameters toward the closed end of the manifold, as per 101A>101B>101C>101D as shown in FIG. 1.
2. Use of non-circular apertures rather than round holes to alter resistance to flow of coolant.
3. Hole 101A is relatively large, while 101B, C and D are equally small.
4. Several adjacent holes simulate one large hole (such as 101A) while B, C and D comprise a lesser number, or single holes; all of the same diameter.

At the time of filing, particular hole diameters have not been established. For the preferred "Duramax" V8 engine at least, the inventors have determined that the total of the diameters of the holes admitting coolant into each manifold corresponds to an area of diameter 23-25 mm or 415 to 490 square mm. Trials in a boat under anticipated working conditions will be required to definitely obtain preferred diameters and combinations of diameters. Normally, hole diameters are set at the time of manufacture of the manifold, although it is possible to remove the exhaust manifold and change the hole diameters later, either by drilling out existing holes in either or both the manifold and the top of the engine block, or by fitting inserts into the holes. The sizes of the apertures may be dependent on the coolant pressure developed by the engine pump. One must be aware of the possibility of turbulent flow arising.

The example engine is manufactured under the assumption that all coolant would exit the engine by way of a connection commencing with a thermostat near the front of the engine and passing back to a pump. This marine conversion retains the thermostat as above particularly for assistance in cold weather starting, although it has not been included in the schematic for simplicity. The example manifold has an open end 202 and a closed end 203. The open end of the manifold is sealably connected by threaded connectors (using threaded holes 220, perhaps containing threaded studs) and normally including a gasket (not shown) to an manifold extension (104 in FIG. 1). This extension also comprises an inner conduit for hot gases, surrounded by jacketing channels carrying coolant, for limiting the maximum temperature of the manifold extension while continuing the cooling process. That coolant is carried into the turbocharger turbine housing (see FIG. 4) and after leaving the turbocharger is returned to the heat exchanger 105 to be cooled by raw water and recycled.

The manifold includes several galleries 215, 216, 217 and 218 that receive and mix the incoming coolant and pass through the body of the manifold approximately parallel to the duct carrying the exhaust gases to terminate at the open end 202 of the manifold 101. Presence of liquid coolant within the channels and galleys simulating a jacket provides an upper limit to the temperature that the body of the manifold may reach during use and commences the process of cooling the exhaust gas. Since the coolant channels are between the source of heat which is the exhaust duct and the exterior surface of the manifold, the temperature rise of the exterior surface will be limited by the coolant temperature although it will be greater once thermal equilibrium has been established.

As a variation, bypass channels inside the engine block may be provided for some of the engine coolant may be provided so that not all the engine coolant flows through the manifold, for example in case exhaust gas cooling is too great. That flow is led into duct 118 for return to the coolant pump 106.

The temperature of the exhaust gas will be higher than if the duct inside the manifold was a thin-walled pipe directly enclosed by a jacket containing water, but not as high as if a prior-art air-shielded water-cooled manifold was used. Of course there is a limit to the optimum amount of exhaust gas cooling prior to passage through the turbocharger 107, because the kinetic energy in this gas makes the turbocharger spin and boost the inlet air pressure and increase the power of the engine. On exiting the turbocharger, the exhaust gases should be sufficiently cooled to satisfy safety requirements.

At the same time, the presence of coolant inside the thermally conductive exhaust manifold and extension and the turbocharger housing ensures that no exposed parts can radiate heat into an engine compartment at a higher temperature than is allowable or advisable.

The preferred turbocharger housing 107, traced from a photograph, is also provided with a hollow external shell (See FIG. 4), again for temperature limitation and gas cooling purposes, as well as for limiting the operating temperature of the turbocharger bearings. FIG. 4 shows a part of the shell 107 of the preferred turbocharger, including channels for coolant 401, 402, and duct for gas 403. 405 indicates one of several mounting apertures. 404 is one of two gas-handling cavities of the turbocharger. 406, and 406a are terminations at the incoming side (406) and the outgoing side (406a) adapted for use with a preferred type of jointing system for pipes, in which a "V-band clamp", a ring of metal having a V-section inwardly facing circumferential groove is tightened over two adjoining pipes so that the edges are brought together. Such prior-art jointing apparatus avoids use of rubber or other elastomers, gaskets, and other failure-prone connections. It is desirable to minimise the number of flexible non-metallic pipes—such as pipes of rubber or like materials carrying coolant. In the prototype there are only three rubber pipes; included in bypass circuits such as through thermostats; the resilient pipes being provided for purposes of overcoming vibration.

The turbocharger compresses air drawn from the environment, inherently heating the compressed air which may also collect heat by conduction from the body of the exhaust turbine. The compressed air is then cooled by being passed through a non-mingling heat exchanger 108 where the heat is transferred into external water which has been collected at an intake 111 equipped with a suitable intake filter, and pressurised by centrifugal pump 110. The cooled compressed air is transferred to the air intake manifolds 115.

Coolant that leaves the turbocharger is now conveyed to a non-mingling heat exchanger 105 constructed, in the case of this Example, in a cylindrical shell that fits closely around the engine. The heat exchanger 105 has the purpose of disposing of heat accumulated by the closed flow of coolant into the non-closed flow of raw water.

RESULTS AND ADVANTAGES

This marine conversion uses a popular engine and is highly compact.

The arrangement and direction of flow of engine coolant through the engine block and through the manifold is optimised so that all cylinders and other parts of the engine are cooled adequately and consistently despite reversal of the direction of flow of exhaust gases; despite the intentional removal of the intended exit of coolant through the front of the engine and its replacement by trans-manifold flow, and despite inclusion of the exhaust manifold, manifold extension and turbocharger in series within the coolant flow circuit.

The dual, non-mingling circuits for recirculating coolant and for single-pass raw water optimise the cooling process, while ensuring that foreign materials do not enter the engine.

All potentially hot parts of the engine exhaust system are in effect blanketed in coolant so that no part of the engine can radiate sufficient high-temperature heat to cause combustion of adjacent surfaces.

In contrast to prior-art marine conversions of similar or the same engine, few external pipes, and in particular a minimised number (about three) external flexible pipes carrying coolant are employed in this marine conversion. This advantage is highly significant since rubber hoses are a vulnerable part of an internal combustion engine, and add cost and bulk to the installation.

Use of a graded series of internal coolant channel apertures for admitting coolant along the length of the manifold provides means for regulating the proportion of coolant along the length of the manifold, so that a relatively even working temperature is obtained along the length of the manifold.

Finally it will be understood that the scope of this invention as described and/or illustrated herein is not limited to the specified embodiment. Those of skill will appreciate that various modifications, additions, known equivalents, and substitutions are possible without departing from the scope and spirit of the invention as set forth in the following claims.

We claim:

1. An internal combustion engine having a front and a rear and converted for marine use, including a turbocharger driven when in use by exhaust gas pressure for compressing aspired air, the engine being internally cooled by a first internal closed coolant circuit with flow caused by a first pump and connected through one or more non-mingling heat exchangers to a flow of raw water caused to flow by a second pump in a second, open circuit; the engine having at least one bank of combustion chambers, each chamber having a corresponding exhaust port brought to a manifold face of an engine head, wherein
   (a) one exhaust manifold for each bank of combustion chambers is formed from a solid thermally conductive mass having a thick wall surrounding a duct when in use of carrying hot exhaust gases from the exhaust ports; the wall being sufficiently thick to include a plurality of internal conduits or galleries; the exhaust manifold having a closed end and an open end;
   (b) coolant apertures are formed through the manifold face of the engine, each aperture creating an opening into an internal coolant gallery surrounding a corresponding combustion chamber;
   (c) the manifold surface along one side of the exhaust manifold includes a series of exhaust channels each aligned with one of the exhaust ports of the bank and leading into duct, and includes a series of coolant channels with a first coolant channel nearest the front, and remaining coolant channels nearest the rear, each coolant channel connecting a corresponding one of coolant apertures into the plurality of internal conduits or galleries of the exhaust manifold, wherein said coolant channels thereby include the exhaust manifold within the closed coolant circuit and when in use limit a temperature of the exhaust manifold by removing heat into the coolant;
   (d) the exhaust manifold further including at least one outlet at the open end for coolant and an outlet for exhaust gases; said outlets being aligned with corresponding inlets of an exhaust manifold extension serving to separately carry the coolant as and gas outflow as from the exhaust manifold to at least one turbocharger;
   (e) wherein each coolant channel is provided with a predetermined resistance to flow of coolant therethrough such that the first coolant channel provides a path of least resistance for coolant flow within the engine and the manifold; said path traversing the interior of the engine from a rear inlet to the front, through the aperture and the coolant channel and then traversing the length of the exhaust manifold towards the open end thereby when in use limiting the maximum temperature of the exterior of the manifold to an amount compatible with use in a marine inboard engine installation yet maintaining a flow of coolant throughout the engine.

2. An internal combustion engine as claimed in claim 1, wherein the remaining coolant channels are each provided with a predetermined resistance to flow greater than that of channel, sufficient to ensure, when in use, at least a sufficient flow of coolant for maintenance of cooling of each chamber of the engine while ensuring that a substantial proportion of coolant traverses the length of the engine from rear to front and then traverses the length of the exhaust manifold from front to rear.

3. An internal combustion engine as claimed in claim 1, wherein the manifold extension includes an inlet physically aligned with a corresponding exhaust gas outlet from the exhaust manifold to an internal exhaust gas duct surrounded by at least one coolant gallery having at least one inlet physically aligned with a corresponding coolant outlet from the exhaust manifold; said duct and galleries serving, when in use, to carry the coolant and gas outflows of the exhaust manifold to at least one turbocharger while flowing coolant serves to limit the maximum external temperature of the manifold extension.

4. An internal combustion engine as claimed in claim 1, wherein the turbocharger has a thermally conductive exterior including at least one gallery for coolant having an input physically aligned with a corresponding outlet for coolant from the manifold extension; thereby limiting the temperature of the turbocharger so as to be compatible with use in a marine inboard engine.

5. An internal combustion engine for inboard marine use as claimed in claim 1, wherein the recirculating coolant is always contained within a range of structures including pump bodies, heat exchangers, rigid pipes, ducts and channels, the range of structures substantially excluding pipes having nonmetallic resilient walls.

6. An internal combustion engine for inboard marine use as claimed in claim 1, wherein the oil cooler includes pressure relief means comprising a valve openable in an event of a pressure differential arising within the oil cooler between an oil input and an oil output pipe; the valve being connected between the oil input and the oil output.

7. An internal combustion engine as claimed in claim 1, wherein the predetermined resistance to flow at each channel formed through the manifold face of the exhaust manifold is determined by making a circular hole of a specified diameter into an adjacent gallery within the exhaust manifold.

8. An internal combustion engine as claimed in claim 7, wherein the total area of the holes receiving coolant from the engine into the exhaust manifold is determined in proportion to the power rating of the engine.

9. An internal combustion engine as claimed in claim 8, wherein the total area of the holes receiving coolant from the engine into one exhaust manifold is set at from 415 to 490 square millimeters, according to the expected power output and efficiency, when in use in a marine application, of a 6.6 Liter V-8 8 cylinder engine.

* * * * *